(12) United States Patent
Buckland et al.

(10) Patent No.: US 6,546,447 B1
(45) Date of Patent: Apr. 8, 2003

(54) METHOD AND APPARATUS FOR DYNAMIC PCI COMBINING FOR PCI BRIDGES

(75) Inventors: Patrick Allen Buckland, Austin, TX (US); Daniel Frank Moertl, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,212

(22) Filed: Mar. 30, 2000

(51) Int. Cl.[7] .......................... G06F 13/36; G06F 13/40
(52) U.S. Cl. ........................ 710/306; 710/307; 710/312
(58) Field of Search .................................. 710/306, 312, 710/307, 310, 57, 35, 309; 370/402; 711/119, 171

(56) References Cited

U.S. PATENT DOCUMENTS

| | | | | |
|---|---|---|---|---|
| 5,638,537 A | * | 6/1997 | Yamada et al. | 711/119 |
| 5,832,242 A | * | 11/1998 | Gulick | 710/306 |
| 5,860,091 A | * | 1/1999 | DeKoning et al. | 711/113 |
| 5,915,104 A | | 6/1999 | Miller | |
| 6,088,777 A | * | 7/2000 | Sorber | 370/381 |
| 6,092,141 A | * | 7/2000 | Lange | 710/310 |
| 6,128,711 A | * | 10/2000 | Duncan et al. | 711/119 |
| 6,163,820 A | * | 12/2000 | Garrett et al. | 710/33 |
| 6,175,889 B1 | * | 1/2001 | Olarig | 370/402 |
| 6,353,877 B1 | * | 3/2002 | Duncan et al. | 710/306 |

* cited by examiner

Primary Examiner—Rupal Dharia
Assistant Examiner—Tim Vo
(74) Attorney, Agent, or Firm—Joan Pennington

(57) ABSTRACT

A method and apparatus are provided for implementing peripheral component interconnect (PCI) combining function for PCI bridges. A programmable boundary for a combined operation is selected. A write request is received. Responsive to the write request, checking for a combined operation hit is performed. Responsive to an identified combined operation hit, a combined operation is accepted. Checking for the selected programmable boundary for the combined operation is performed. Responsive to identifying the programmable boundary for the combined operation, the combined operation is launched to a destination bus. A programmable timer is identified for the combined operation. Responsive to the programmable timer expiring, the combined operation is launched to a destination bus. The programmable boundary for a combined operation is selected responsive to reading an adapter type and one of combining with a 128-byte boundary, combining with a 256-byte boundary, combining with a 512-byte boundary, or a posted memory write (PMW) is selected.

10 Claims, 6 Drawing Sheets

MEMORY SUBDIVIDE REGISTER 400

| MSB (31) LSB (0) | NAME | DESCRIPTION | TYPE |
|---|---|---|---|
| 8:6 | READ LINE PREFETCH SIZE | THIS FIELD VALUE IS USED IF THE COMMAND WAS A READ LINE. | R/W |
| 5:3 | READ MULTIPLE PREFETCH SIZE | THIS FIELD VALUE IS USED IF THE COMMAND WAS A READ MULTIPLE. | R/W |
| 2:0 | WRITE SIZE | THIS CONTROLS THE TYPE OF MEMORY WRITE CYCLE SUPPORTED.<br><br>100 = POSTED WRITES WITH COMBINING TO A 128-BYTE BOUNDARY<br><br>101 = POSTED WRITES WITH COMBINING TO A 256-BYTE BOUNDARY<br><br>110 = POSTED WRITES WITH COMBINING TO A 512-BYTE BOUNDARY<br><br>111 = POSTED WRITES NO COMBINING, 512-BYTE BOUNDARY<br><br>COMBINING, WHEN ENABLED, WILL OCCUR IF A WRITE DID NOT FILL THE 128/256/512-BYTE BUFFER. | R/W |
| POWER ON RESET: 00000000 00000000 00000000 0000000b | | | |

FIG. 4

METHOD AND APPARATUS FOR DYNAMIC PCI COMBINING FOR PCI BRIDGES

FIELD OF THE INVENTION

The present invention relates to a method and apparatus for implementing peripheral component interconnect (PCI) combining function for PCI bridges.

DESCRIPTION OF THE RELATED ART

When an input/output adapter (IOA) writes into system memory with a packet that is smaller than the system cache line size, two performance problems are created. First the system memory controller must snoop the main processor, and if data resides in its cache, the data must be flushed out to main memory or cast out before the IOA write can occur. Second the system memory controller must issue a read-modify-write. If there is a lot of this type of traffic, then system performance can be greatly degraded. But if a write were aligned to a cache line size where the starting address of the write is a cache line boundary, and the size is an integral number of cache lines, then the write would have a smaller impact on system performance, since no cast out and not read-modify-write would occur. Thus a high bandwidth IOA that always aligns its direct memory accesses (DMAs) cause less degradation to system performance than a lower bandwidth IOA that does not align its DMAs.

Most IOAs do DMA a continuous data stream to system memory but many do so with a very small packet size, for example 4-bytes or 32-bytes, and with a large delay between each packet. The impact of these types of IOAs on system performance, such as on IBM RS6000 and IBM AS/400 system performance, is measurable and a concern. These performance impacts get worst with increasing speed of those system's main processors.

A peripheral component interconnect (PCI) local bus system often includes a primary 64-bit PCI bus and multiple, such as eight secondary PCI busses. The PCI local bus is a high performance, 32-bit or 64-bit bus with multiplexed address and data lines. The bus is used as an interconnect mechanism between highly integrated peripheral controller components, peripheral add-in boards, and processor and memory systems.

A peripheral component interconnect (PCI) bridge can be used for combining. Combining occurs when sequential memory write transactions with a single data phase or burst and independent of active byte enables are combined into a single PCI bus transaction using linear burst ordering. Under certain conditions, PCI bridges that receive write data may attempt to convert a transaction with a single or multiple data phases into a large transaction to optimize data transfer.

U.S. Pat. No. 5,915,104 issued Jun. 22, 1999 discloses a PCI bridge that acts as an interface between the PCI bus and a packet switched router. Write gathering is used to gather a plurality of write transactions on the PCI bus into write buffers and sent by the bridge as one 128 byte cache line sized transfer to the routing mechanism.

A need exists for an improved method and apparatus for implementing peripheral component interconnect (PCI) combining function for PCI bridges. It is desirable to provide such method and apparatus for implementing peripheral component interconnect (PCI) combining function for PCI bridges that can combine multiple secondary bus packet writes into a single aligned host bus write and that can alleviate the host read-modify-write penalty.

SUMMARY OF THE INVENTION

A principal object of the present invention is to provide a method and apparatus for implementing peripheral component interconnect (PCI) combining function for PCI bridges. Other important objects of the present invention are to provide such method and apparatus for implementing peripheral component interconnect (PCI) combining function for PCI bridges substantially without negative effect; and that overcome many of the disadvantages of prior art arrangements.

In brief, a method and apparatus are provided for implementing peripheral component interconnect (PCI) combining function for PCI bridges. A programmable boundary for a combined operation is selected. A write request is received. Responsive to the write request, checking for a combined operation hit is performed. Responsive to an identified combined operation hit, a combined operation is accepted. Checking for the selected programmable boundary for the combined operation is performed. Responsive to identifying the programmable boundary for the combined operation, the combined operation is launched to a destination bus.

In accordance with features of the invention, a programmable timer is identified for the combined operation. Responsive to the programmable timer expiring, the combined operation is launched to a destination bus. The programmable boundary for a combined operation is selected responsive to reading an adapter type and one of combining with a 128-byte boundary, combining with a 256-byte boundary, combining with a 512-byte boundary, or a posted memory write (PMW) is selected.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 is a diagram illustrating a memory subdivide register in accordance with the preferred embodiment.

DETAILED DESCRIPTION OF THE PREFERRED EMBODIMENTS

Figure 1:
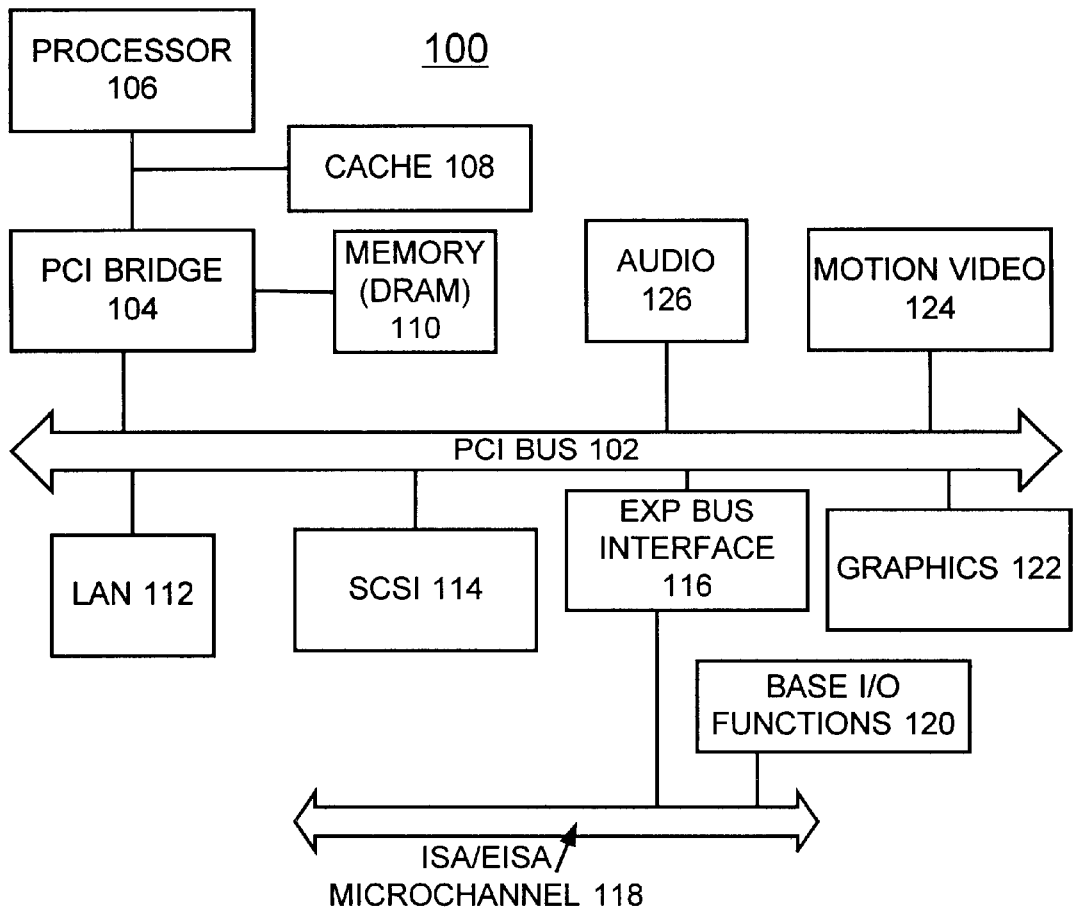
FIG. 1 is a block diagram representation illustrating a peripheral component interconnect PCI local bus system in accordance with the preferred embodiment.

Having reference now to the drawings, in FIG. 1, there is shown a peripheral component interconnect PCI local bus system of the preferred embodiment generally designated by the reference character 100. Peripheral component interconnect PCI local bus system 100 includes a PCI bus 102. As shown in FIG. 1, peripheral component interconnect PCI local bus system 100 includes a PCI bridge 104 coupled to a processor 106, a cache 108 and a dynamic random access memory (DRAM) 110. A local area network (LAN) 112, a small computer system interface (SCSI) 114, and an expansion bus interface 116 connected to an ISA/EISA microchannel 118. Base I/O functions block 120 is coupled to the ISA/EISA microchannel 118. A graphics card 122, a motion video card 124 and an audio card 126 are supported by PCI bus 102. It should be understood that the present invention is not limited to a particular computer model or the architecture as shown in FIG. 1. Various commercially available PCI local bus systems can be used for PCI local bus system 100.

Figure 2:
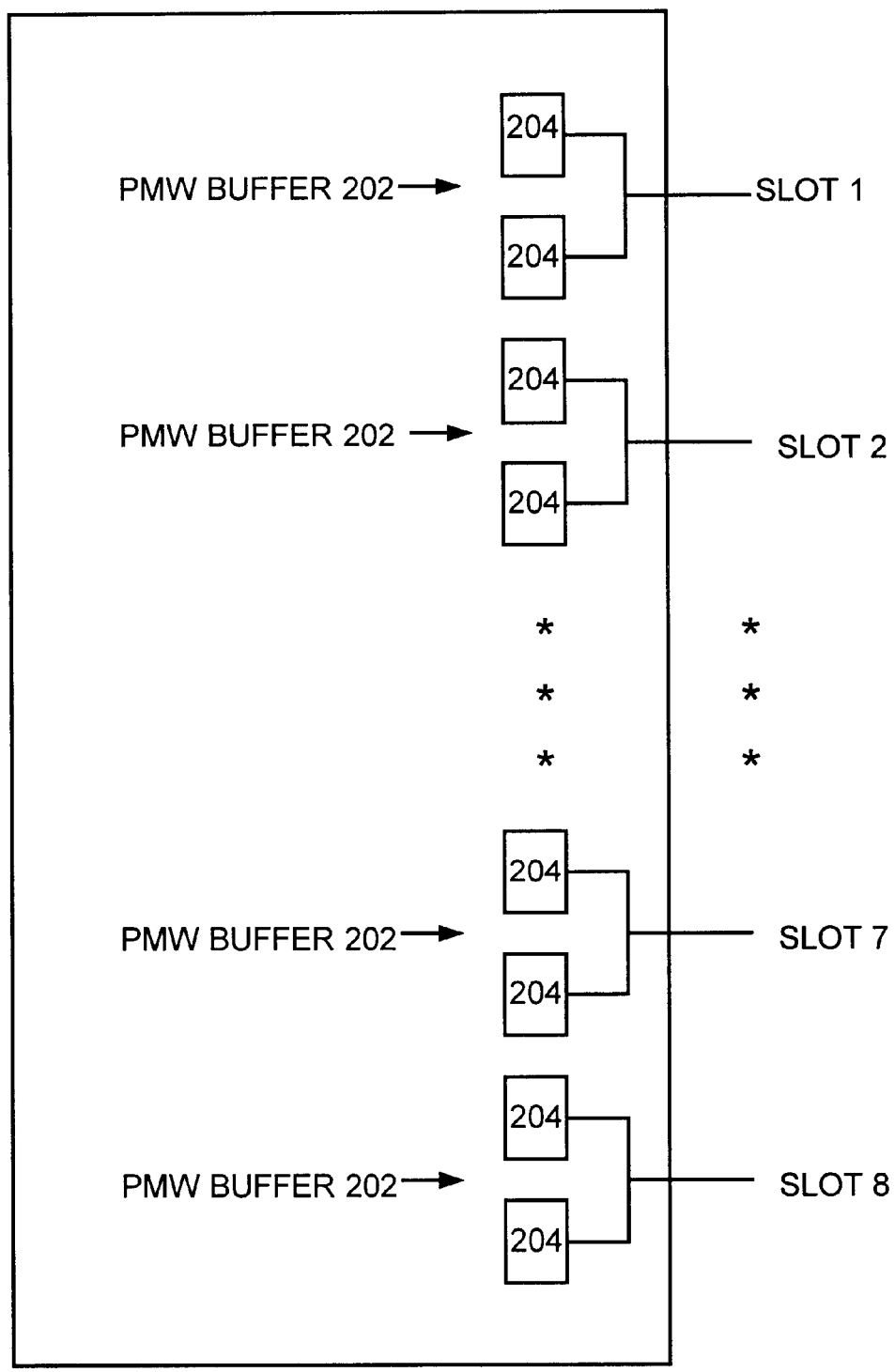
FIG. 2 is a block diagram representation illustrating a PCI bridge with a combining function in accordance with the preferred embodiment.

Referring to FIG. 2, a PCI bridge chip of the preferred embodiment generally designated by the reference character 200 is shown. A posted memory write (PMW) buffer 202 is coupled to each PCI slot 1–8. The PMW buffer 202 includes a pair of 512 byte buffers 204. The pair of 512 byte buffers 204 are used for write combining in accordance with the preferred embodiment.

In accordance with feature of the preferred embodiment, three programmable different cache line sizes of 128-byte, 256-byte and 512-byte are provided. A programmable timer is used to wait for the next operation (OP) for write combining in accordance with the preferred embodiment. Write combining in accordance with the preferred embodiment can be invoked on a per slot adapter basis. PCI bridge chip 200 converts small unaligned sequential writes it receives on its secondary bus into larger aligned writes on the primary bus. When a write is received, the PCI bridge chip 200 will not immediately send it on to the host bus. Instead, PCI bridge chip 200 will wait a programmable time, such as 0 to 14 microseconds, to see if the IOA will continue the write. If a new write comes in within that time window, and the new write starts where the old write ended, then that packet will be combined with the previous packet inside the PCI bridge chip 200. If the timer expires then the current combined packet is sent to the host. The timer is then reset to zero and the PCI bridge chip 200 waits for the next packet. A packet also will be sent to the host bus when it reaches a specific programmable address boundary of 128-bytes, 256-bytes, or 512-bytes. If either the programmable timer expires or the programmable address boundary is met, the combined packet will be launched to its destination bus. Other factors that cause the PCI bridge chip 200 to launch the combined packet include a read, delayed writes, configure or I/O, or another memory write to a non-sequential address based on the last address associated with the combined packet.

Figure 3:
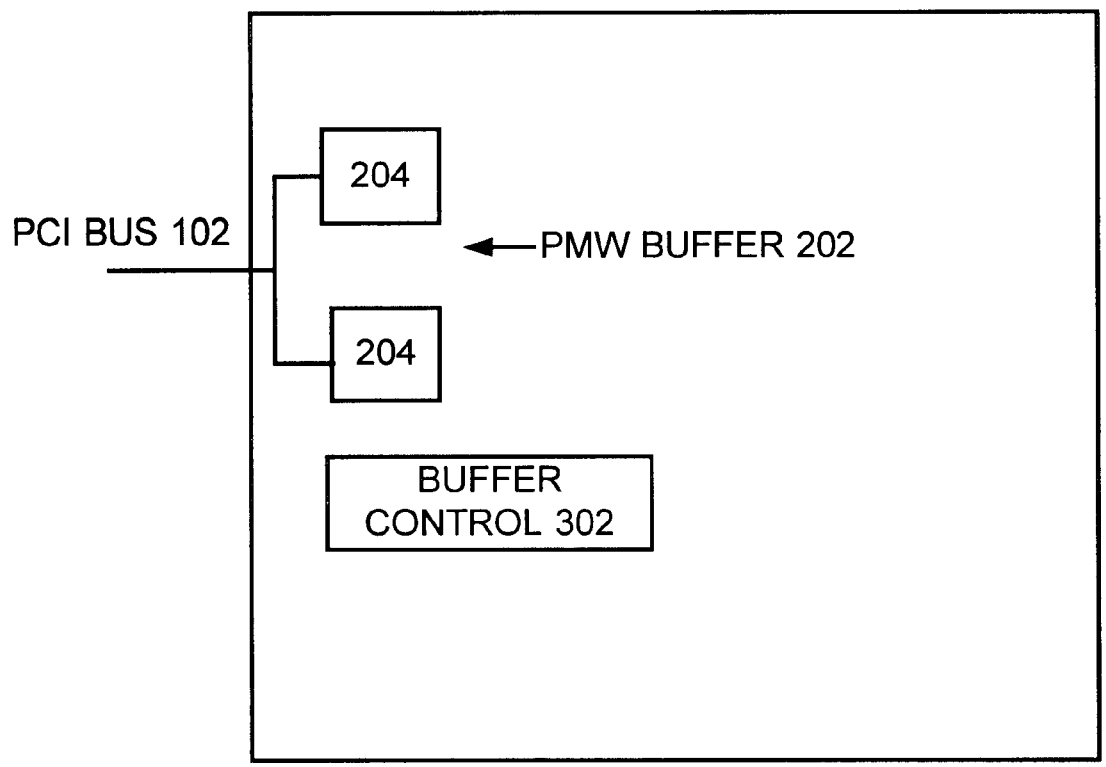
FIG. 3 is a schematic diagram representation illustrating a PCI bridge with a combining function in accordance with the preferred embodiment.

Referring also to FIG. 3, each slot 300 of the PCI bridge chip 200 includes the PMW buffer 202 including the pair of 512 byte buffers 204 and a buffer control 302. Buffer control 302 processes inputs from the PCI bus, accepts OPs, retries OPs, and disconnects OPs. Buffer control 302 performs write combining in accordance with the preferred embodiment as illustrated and described with respect to FIGS. 5 and 6.

Referring to FIG. 4, a memory subdivide register 400 provides bit definitions for write combining in accordance with the preferred embodiment. Bits 2:0 define a write size as set forth in the following Table 1:

TABLE 1

| |
|---|
| 100 = posted writes with combining to a 128-byte boundary. |
| 101 = posted writes with combining to a 256-byte boundary. |
| 110 = posted writes with combining to a 512-byte boundary. |
| 111 = posted writes no combining, 512-byte boundary. |

Combining, when enabled, will occur if a write did not fill the programmable 128-byte, 256-byte or 512-byte boundary or reach a 128-byte, 256-byte or 512-byte address. After the burst, hardware waits for a programmable time interval N, where N is programmable, about 10 μs, to see if the slot will return to continue the operation from where it left off. If it does then the same buffer is used and the two bursts are combined into one. Any other target packet will cause this combining to stop and the previous posted OP will be sent on. If the write does reach the end of the address boundary, then it is sent on without delay. Combining is useful when the device chip DMAs large blocks of data but uses a small burst size, such as 64-bytes or 128-bytes. Combining will be switched to posted memory writes when the interrupt is active.

Figure 5:
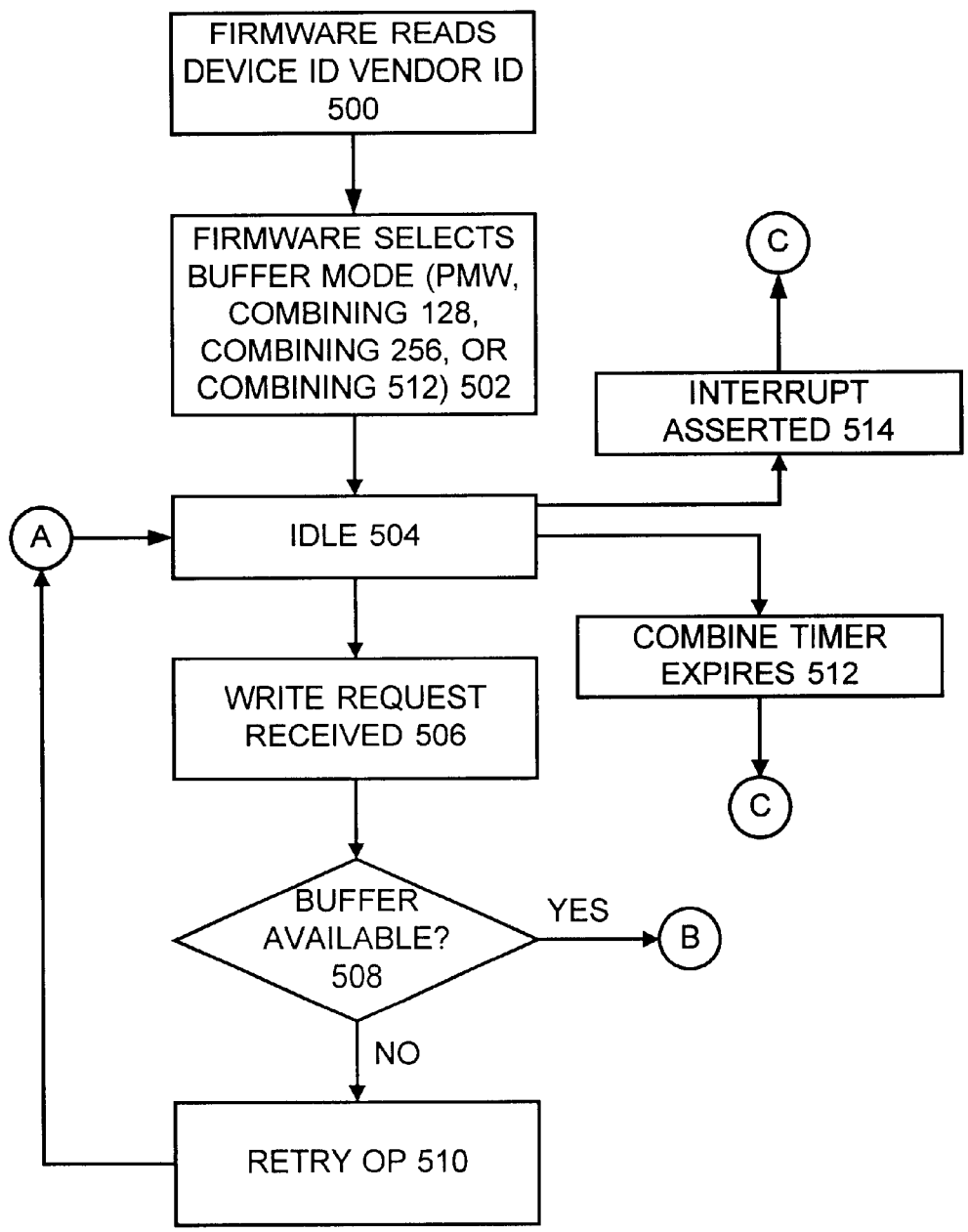
FIGS. 5 and 6 are logical flow charts illustrating exemplary sequential steps for implementing peripheral component interconnect (PCI) combining function for PCI bridges in accordance with the preferred embodiment.
Figure 6:
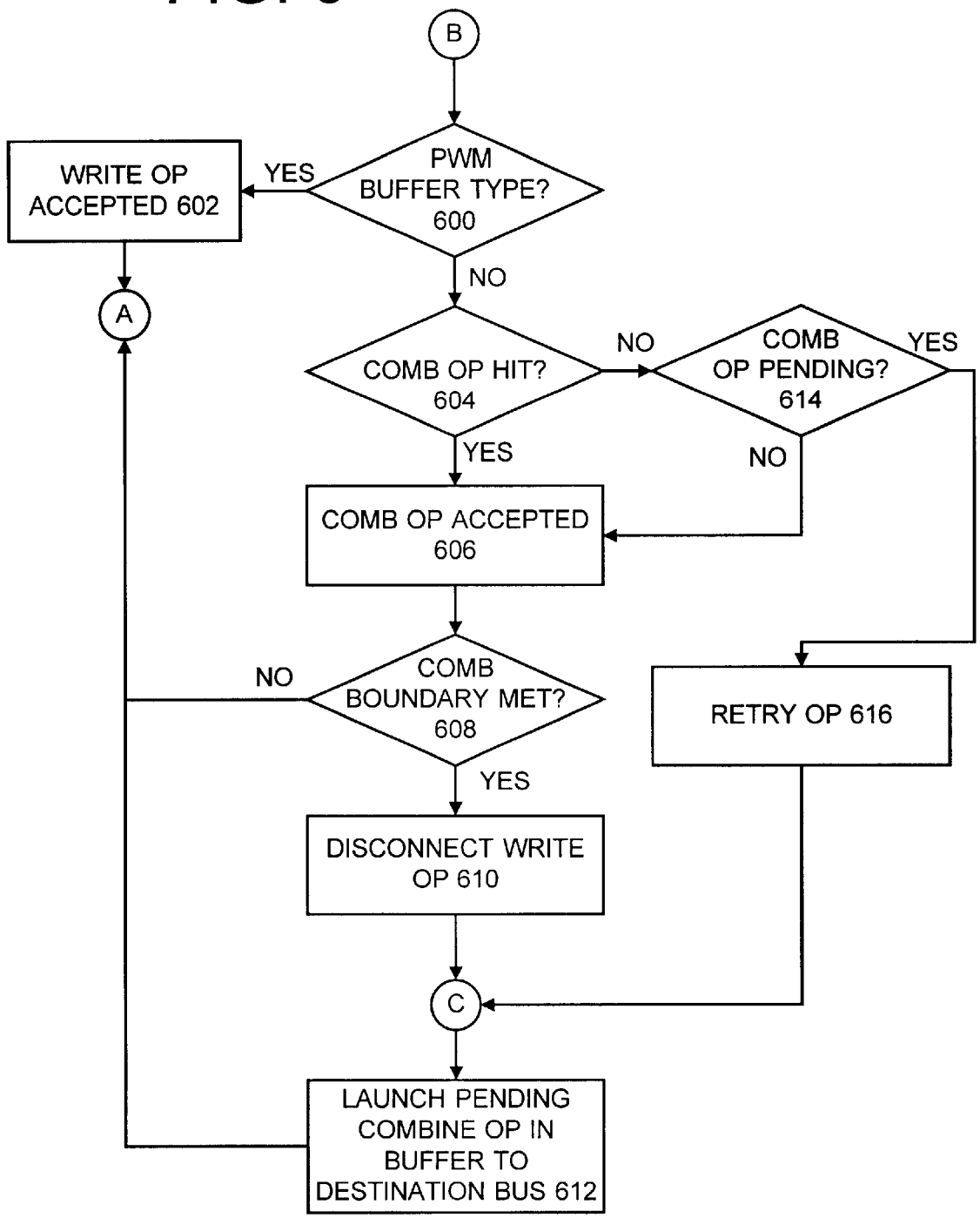

Referring now to FIGS. 5 and 6, there are shown logical flow charts illustrating exemplary sequential steps for implementing peripheral component interconnect (PCI) combining function for PCI bridges in accordance with the preferred embodiment. First the firmware of buffer control 302 reads a device ID, vendor ID as indicated in a block 500. Responsive to the identified device ID, vendor ID, the firmware of buffer control 302 selects a buffer mode of posted memory write (PMW), combining with a 128-byte boundary, combining with a 256-byte boundary, or combining with a 512-byte boundary as indicated in a block 502. For example, a system having a cache line of size of 256-bytes will suffer performance penalties when doing 128-byte writes, so this system would run in the 256-byte combining mode. Adapters doing 32-byte writes would typically prefer a 128-byte boundary setting. While adapters doing 96-byte writes would typically perform better with a 256-byte or 512-byte boundary setting. An idle mode is shown as indicated in a block 504.

A received write request is processed as indicated in a block 506. Then checking for an available buffer is performed as indicated in a decision block 508. When a buffer is not available, then a retry operation is performed as indicated in a block 510, then returning to the idle mode at block 504. When an available buffer is identified, then the sequential operations continue following entry point B in FIG. 6. As indicated in a block 512, when a combine timer expires, then the sequential operations continue following entry point C in FIG. 6 to launch the pending combine operation to its destination bus. The combine timer provides a programmable time period before the combined packet is issued. This allows flexibility to handle a range of adapters. For example, for slow adapters that issue writes every 10 microseconds, the programmable time period set by the combine timer can be set for 10 microseconds. Adapters that issue writes more frequently will have a lower timer setting. When an interrupt is asserted as indicated in a block 514, then the sequential operations continue following entry point C in FIG. 6 to launch the pending combine operation to its destination bus.

Referring to FIG. 6, checking for a buffer type is performed as indicated in a decision block 600. When a posted memory write (PMW) is identified with combining not enabled, then the write operation is accepted as indicated in a block 602. Otherwise, checking for a combined operation hit is performed as indicated in a decision block 604. When a combined operation hit is identified, then a combined operation is accepted as indicated in a block 606. Then checking whether a combined boundary is met is performed as indicated in a decision block 608. When a combined boundary is not met, then the sequential operations return to the idle block 504 following entry point A in FIG. 5. When a combined boundary is met, then a write operation is disconnected as indicated in a block 610. The combined operation in the buffer is launched to its destination bus as indicated in a block 612. When a combined operation hit is not identified at decision block 604, then checking for a combined operation pending is performed as indicated in a decision block 614. When a combined operation pending is identified, then a retry operation is posted as indicated in a block 616. Then the combined operation in the buffer is launched to its destination bus at block 612. When a combined operation pending is not identified, then a combined operation is accepted at block 606.

While the present invention has been described with reference to the details of the embodiments of the invention shown in the drawing, these details are not intended to limit the scope of the invention as claimed in the appended claims.

What is claimed is:

1. A method for implementing peripheral component interconnect (PCI) combining function for PCI bridges comprising the steps of:

identifying an adapter type;

responsive to said adapter type, selecting a buffer mode including a programmable boundary for a combined operation; said buffer mode including one of combining with a 128-byte boundary, combining with a 256-byte boundary, combining with a 512-byte boundary, or posted memory write (PMW);

receiving a write request on a secondary bus;

responsive to said write request, checking for a combined operation hit;

responsive to an identified combined operation hit, accepting a combined operation;

checking for said selected programmable boundary for said combined operation;

responsive to identifying said programmable boundary for said combined operation, launching said combined operation to a destination primary bus.

2. A method for implementing peripheral component interconnect (PCI) combining function for PCI bridges as recited in claim 1 further includes the steps of identifying a programmable timer for said combined operation; and responsive to said programmable timer expiring, launching said combined operation to said destination primary bus.

3. A method for implementing peripheral component interconnect (PCI) combining function for PCI bridges as recited in claim 1 further includes the steps of identifying an interrupt asserted; and launching said combined operation to said destination primary bus.

4. A method for implementing peripheral component interconnect (PCI) combining function for PCI bridges as recited in claim 1 further includes the step of responsive to said write request, checking for said buffer mode of said posted memory write (PMW); and responsive to an identified buffer mode of posted memory write (PMW), accepting a write operation.

5. A method for implementing peripheral component interconnect (PCI) combining function for PCI bridges as recited in claim 1 further includes the step of responsive to said combined operation hit not being identified, checking for a pending combined operation; and responsive to an identified pending combined operation, launching said pending combined operation to said destination primary bus.

6. A method for implementing peripheral component interconnect (PCI) combining function for PCI bridges as recited in claim 5 further includes the step of posting a retry operation.

7. A method for implementing peripheral component interconnect (PCI) combining function for PCI bridges as recited in claim 5 further includes the step of responsive to said pending combined operation not being identified, accepting said combined operation.

8. A PCI bridge for implementing peripheral component interconnect (PCI) combining function comprising:

a PCI slot;

a buffer coupled to said PCI slot;

a buffer control coupled to said buffer; said buffer control performing the steps of:

selecting a buffer mode including a selected programmable boundary for a combined operation; said buffer mode including one of combining with a 128-byte boundary, combining with a 256-byte boundary, combining with a 512-byte boundary, or posted memory write (PMW);

receiving a write request on a secondary bus;

responsive to said write request, checking for a combined operation hit;

responsive to an identified combined operation hit, accepting a combined operation;

checking for said selected programmable boundary for said combined operation;

responsive to identifying said programmable boundary for said combined operation, launching said combined operation to a destination primary bus.

9. A PCI bridge for implementing peripheral component interconnect (PCI) combining function as recited in claim 8 wherein said buffer control further performs the step of:

identifying a programmable timer for said combined operation; and responsive to said programmable timer expiring, launching said combined operation to said destination primary bus.

10. A PCI bridge for implementing peripheral component interconnect (PCI) combining function as recited in claim 8 wherein said buffer control further performs the step of:

identifying an asserted interrupt; and responsive to said identified asserted interrupt, launching said combined operation to said destination primary bus.

* * * * *